(12) United States Patent
Krain

(10) Patent No.: US 12,426,705 B1
(45) Date of Patent: Sep. 30, 2025

(54) MOBILE LAPTOP DESK

(71) Applicant: Stephen Krain, St. Augustine, FL (US)

(72) Inventor: Stephen Krain, St. Augustine, FL (US)

( * ) Notice: Subject to any disclaimer, the term of this patent is extended or adjusted under 35 U.S.C. 154(b) by 0 days.

(21) Appl. No.: 18/514,350

(22) Filed: Nov. 20, 2023

(51) Int. Cl.
*A47B 23/04* (2006.01)
*F16M 11/10* (2006.01)
*F16M 11/20* (2006.01)

(52) U.S. Cl.
CPC ........... *A47B 23/043* (2013.01); *F16M 11/10* (2013.01); *F16M 11/2021* (2013.01); *F16M 2200/06* (2013.01)

(58) Field of Classification Search
CPC ............ A47B 23/001; A47B 2023/004; A47B 2023/005; A47B 2023/043; A47B 2023/044; A47B 2023/046; A47B 19/08; F16M 11/10; F16M 11/38; F16M 2200/068
USPC ................ 248/460, 461, 462, 463, 464, 465
See application file for complete search history.

(56) References Cited

U.S. PATENT DOCUMENTS

| | | | | |
|---|---|---|---|---|
| 1,330,388 A | * | 2/1920 | O'Donnell | A47B 19/08 248/461 |
| 10,400,943 B2 | * | 9/2019 | Lau | F16M 11/38 |
| 2015/0227165 A1 | * | 8/2015 | Feng | F16M 11/14 361/679.56 |
| 2023/0129761 A1 | * | 4/2023 | Kotecha | A47B 23/042 248/462 |

* cited by examiner

*Primary Examiner* — Alfred J Wujciak
(74) *Attorney, Agent, or Firm* — Daniel Polk; Darryl Scott

(57) ABSTRACT

According to an aspect of the present invention, there is provided a stand for an electronic device, comprising: a base plate; a first pivot point attached to a first folding plate; two first folding pivot arms connecting to the first folding plate at a second pivot point; two second folding pivot arms connecting to the first pivot arms at a third pivot point; and an electronic device holding plate connecting to the second pivot arms at a fourth pivot point.

18 Claims, 3 Drawing Sheets

MOBILE LAPTOP DESK

BACKGROUND

Stands for supporting a computing device, such as a laptop computer, have been described in the prior art patent literature.

For example, U.S. Pat. No. 9,894,988 discloses a stand for supporting a computing device and a method of assembling the stand. The stand may support the computing device at a height such that a screen of the computing device is at or near eye-level of a user. The stand may include a frame member and a gripping mechanism attached to an end of the frame member. The gripping mechanism may secure the computing device to the stand. The stand may include support legs, rotating legs attached to the support legs to provide an offset to the support legs, and gripping mechanisms attached to ends of the rotating legs and attachable to the lower edge of the laptop such that the laptop is suspended from the bottom edge of the chassis.

U.S. Pat. No. 11,291,298 discloses a lifting table, comprising an upper platform, a lower platform, and at least one group of lifting component positioned between the upper and lower platforms and used for adjusting the height of the upper platform relative to the lower platform; the lifting table further comprises elastic elements and sliding components sliding fit on the upper or lower platform; the sliding components are connected with the elastic elements for sliding on the upper or lower platform under the effect of elastic forces from the elastic elements; each sliding component has a push part, the lifting component exerts an acting force to the push part so that the sliding component overcomes the elastic force of the elastic element to slide along the upper or lower platform, and is simple and labor-saving in operation and good in user experience.

Nevertheless, prior art laptop desks suffer from limitations including difficulty of use and lack of mobility.

SUMMARY OF INVENTION

Therefore, the present invention provides a portable laptop stand which can easily be used anywhere including for a standing desk and which seamlessly collapses into a flat compact form.

According to an aspect of the present invention, there is provided a stand for an electronic device, comprising: a base plate; a first pivot point attached to a first folding plate; two first folding pivot arms connecting to the first folding plate at a second pivot point; two second folding pivot arms connecting to the first pivot arms at a third pivot point; and an electronic device holding plate connecting to the second pivot arms at a fourth pivot point.

DETAILED DESCRIPTION

Figure 1:
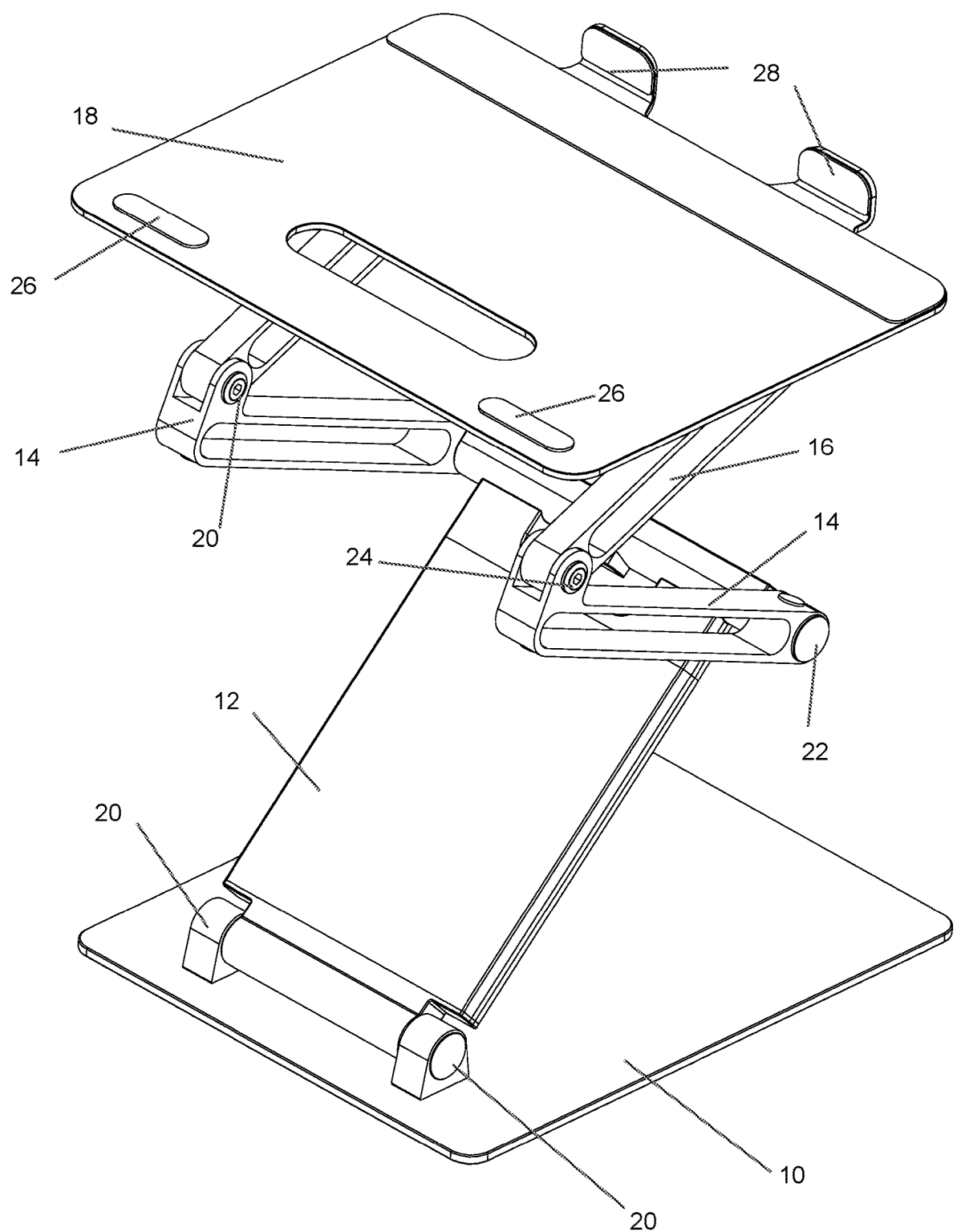
FIG. 1 illustrates a perspective view of a portable laptop stand according to an embodiment of the present invention.

In FIG. 1, base plate 10 is designed to sit atop a desk, table, or other surface or on the ground.

First pivoting plate 12 connects to base plate 10 at first pivoting point 20 and helps to provide stability. First pivoting plate 12 can fold on top of base plate 10 for ease of storage and transport.

First pivoting rods 14 connect to first pivoting plate 12 at second pivoting point 22.

Second pivoting rods 16 connect to first pivoting rods 14 at third pivoting points 20 and 24 on either side of the stand.

A fourth pivoting point at which electronic device holding plate 18 is connected to the second pivot arms is not visible from the angle of FIG. 1.

Retaining pads 26 and retaining protrusions 28 can be used to retain an electronic device in position. In FIG. 1 two retaining pads 26 are positioned on the electronic device holding plate 18. In FIG. 1 two retaining protrusions 28 are positioned on the electronic device holding plate 18.

Figure 2:
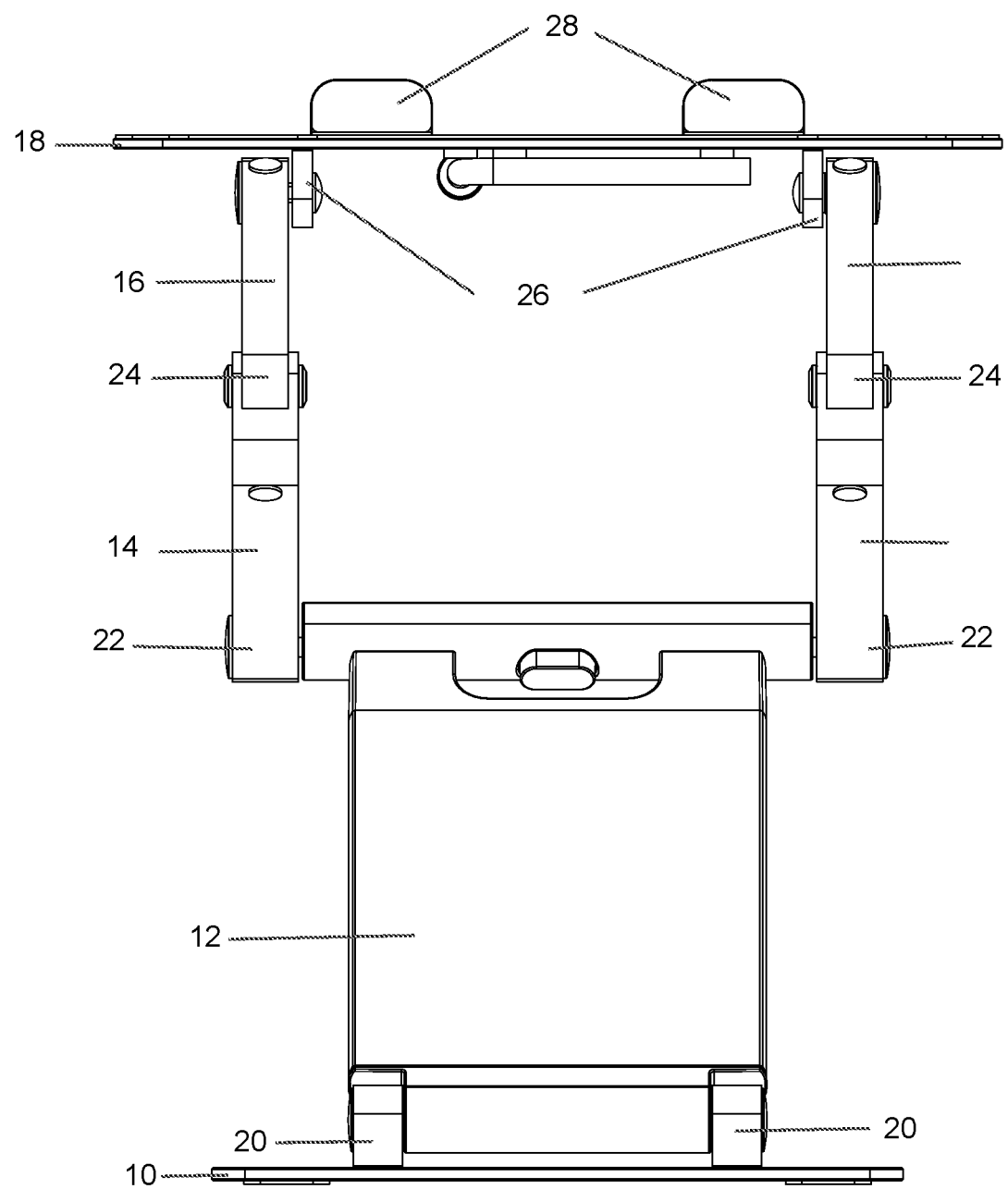
FIG. 2 illustrates a front view of the portable laptop stand according to an embodiment of the present invention.

In the view of FIG. 2, base plate 10 is shown from the front in flat position and the portable laptop stand of the embodiment is extended.

First pivoting plate 12 connects to base plate 10 at first pivoting point 20 and helps to provide stability. First pivoting plate 12 can fold on top of base plate 10 for ease of storage and transport.

First pivoting rods 14 connect to first pivoting plate 12 at second pivoting point 22.

Second pivoting rods 16 connect to first pivoting rods 14 at third pivoting points 20 and 24 on either side of the stand.

Fourth pivoting point 26 at which electronic device holding plate 18 is connected to the second pivot arms allows for the electronic device holding plate to move at an angle, which may be convenient for some users.

Retaining protrusions 28 can be seen extending above the electronic device holding plate.

Figure 3:
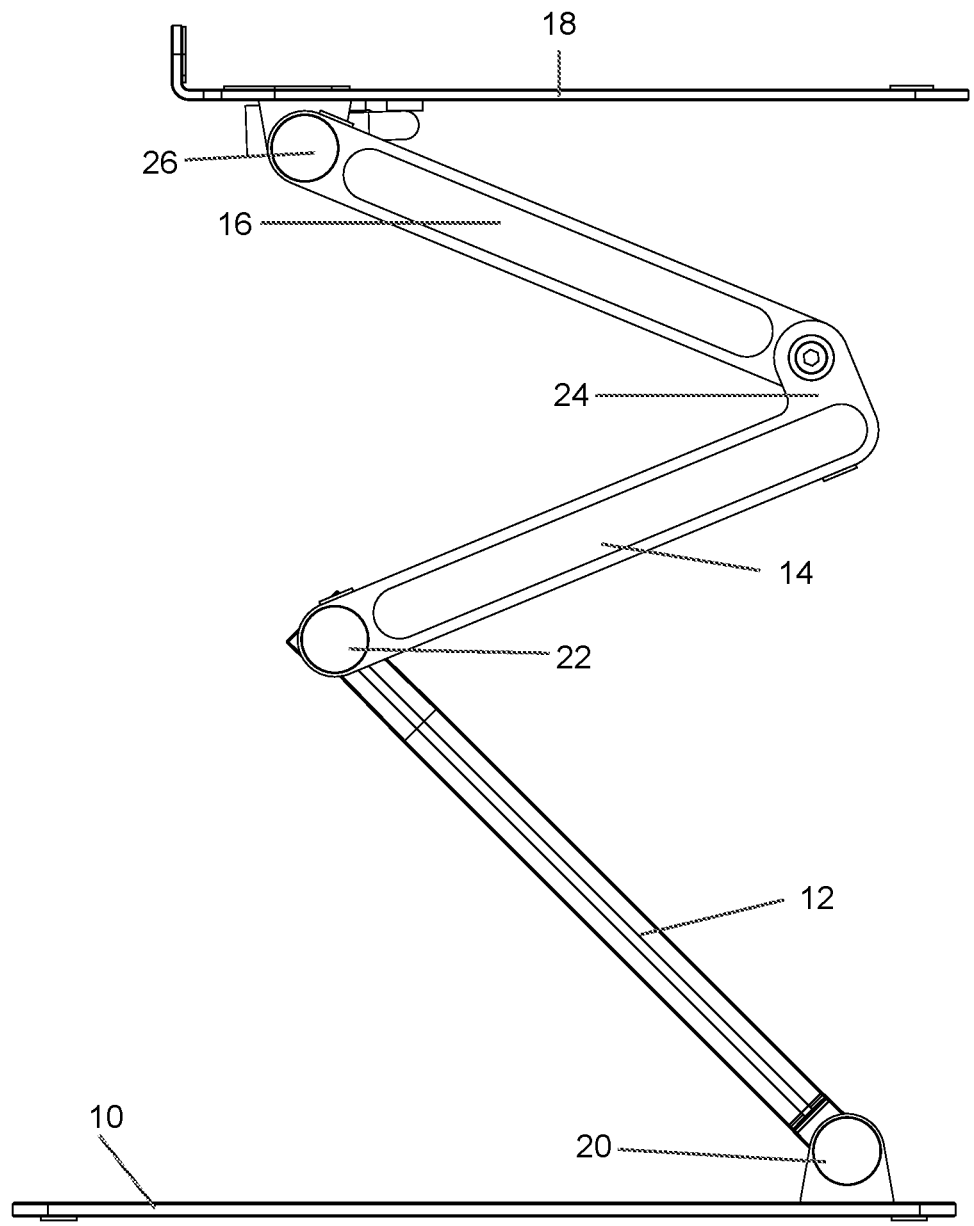
FIG. 3 illustrates a side view of the portable laptop stand according to an embodiment of the present invention.

In the view of FIG. 3, base plate 10 is shown from the side in flat position and the portable laptop stand of the embodiment is extended. The height of the portable laptop stand can be adjusted by moving the pivot arms.

First pivoting plate 12 connects to base plate 10 at first pivoting point 20 and helps to provide stability. First pivoting plate 12 can fold on top of base plate 10 for ease of storage and transport.

First pivoting rods 14 connect to first pivoting plate 12 at second pivoting point 22.

Second pivoting rods 16 connect to first pivoting rods 14 at third pivoting points 20 and 24 on either side of the stand.

Fourth pivoting point 26 at which electronic device holding plate 18 is connected to the second pivot arms allows for the electronic device holding plate to move at an angle, which may be convenient for some users.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Similar numerals designate similar elements among the several figures. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A stand for an electronic device, comprising: a base plate;
    a first pivot point attached to a first folding plate, wherein the first folding plate is pivotally connected to the base plate at the first pivot point;
    two first folding pivot arms connecting to the first folding plate at a second pivot point;
    two second folding pivot arms connecting to the first pivot arms at a third pivot point; and
    an electronic device holding plate comprising one or more retaining pads positioned on the electronic device holding plate; the electronic device holding plate connecting to the second pivot arms at a fourth pivot point.

2. The stand for an electronic device of claim 1, further comprising one or more retaining protrusions positioned on the electronic device holding plate.

3. The stand for an electronic device of claim 2, further comprising two retaining protrusions positioned on the electronic device holding plate.

4. The stand for an electronic device of claim 2, wherein the first folding plate is configured to fold on top of the base plate.

5. The stand for an electronic device of claim 2, wherein the two first folding pivot arms are configured to fold on the side of the first folding plate.

6. The stand for an electronic device of claim 2, wherein the two second folding pivot arms are configured to fold on top of the first folding pivot arms.

7. The stand for an electronic device of claim 2, wherein the electronic device holding plate is configured to fold on top of the first folding plate.

8. The stand for an electronic device of claim 1, wherein the first folding plate is configured to fold on top of the base plate.

9. The stand for an electronic device of claim 1, wherein the two first folding pivot arms are configured to fold on the side of the first folding plate.

10. The stand for an electronic device of claim 1, wherein the two second folding pivot arms are configured to fold on top of the first folding pivot arms.

11. The stand for an electronic device of claim 1, wherein the electronic device holding plate is configured to fold on top of the first folding plate.

12. A stand for an electronic device, comprising:
    a base plate;
    a first pivot point attached to a first folding plate, wherein the first folding plate is pivotally connected to the base plate at the first pivot point;
    two first folding pivot arms connecting to the first folding plate at a second pivot point;
    two second folding pivot arms connecting to the first pivot arms at a third pivot point; and
    an electronic device holding plate comprising two retaining pads positioned on the electronic device holding plate; the electronic device holding plate connecting to the second pivot arms at a fourth pivot point.

13. The stand for an electronic device of claim 12, further comprising one or more retaining protrusions positioned on the electronic device holding plate.

14. The stand for an electronic device of claim 12, further comprising two retaining protrusions positioned on the electronic device holding plate.

15. The stand for an electronic device of claim 14, wherein the first folding plate is configured to fold on top of the base plate.

16. The stand for an electronic device of claim 14, wherein the two first folding pivot arms are configured to fold on the side of the first folding plate.

17. The stand for an electronic device of claim 14, wherein the two second folding pivot arms are configured to fold on top of the first folding pivot arms.

18. The stand for an electronic device of claim 14, wherein the electronic device holding plate is configured to fold on top of the first folding plate.

* * * * *